US011045815B2

(12) United States Patent
Tsuda et al.

(10) Patent No.: US 11,045,815 B2
(45) Date of Patent: Jun. 29, 2021

(54) POWDER GRINDING METHOD AND POWDER GRINDING MACHINE

(71) Applicant: SAKAI CHEMICAL INDUSTRY CO., LTD., Sakai (JP)

(72) Inventors: Koichi Tsuda, Sakai (JP); Hiromasa Okita, Sakai (JP)

(73) Assignee: SAKAI CHEMICAL INDUSTRY CO., LTD., Sakai (JP)

( * ) Notice: Subject to any disclaimer, the term of this patent is extended or adjusted under 35 U.S.C. 154(b) by 525 days.

(21) Appl. No.: 16/071,275

(22) PCT Filed: Jan. 16, 2017

(86) PCT No.: PCT/JP2017/001235
§ 371 (c)(1),
(2) Date: Jul. 19, 2018

(87) PCT Pub. No.: WO2017/126470
PCT Pub. Date: Jul. 27, 2017

(65) Prior Publication Data
US 2020/0156081 A1    May 21, 2020

(30) Foreign Application Priority Data

Jan. 21, 2016    (JP) .............................. JP2016-009803

(51) Int. Cl.
*B02C 19/06* (2006.01)
*B02C 23/12* (2006.01)
(Continued)

(52) U.S. Cl.
CPC .............. *B02C 19/06* (2013.01); *B02C 23/12* (2013.01); *C01F 5/14* (2013.01); *C01F 11/462* (2013.01); *C01P 2004/61* (2013.01)

(58) Field of Classification Search
CPC .............................. B02C 19/06; B02C 19/061
(Continued)

(56) References Cited

U.S. PATENT DOCUMENTS 2,821,346 A * 1/1958 Fisher ..................... B02C 19/06
241/39
3,229,918 A * 1/1966 Trost ....................... B02C 19/06
241/39
(Continued)

FOREIGN PATENT DOCUMENTS

JP         S54-183083 U    12/1979
JP            3026354 U     7/1996
(Continued)

OTHER PUBLICATIONS

International Search Report dated Mar. 28, 2017 from International Application No. PCT/JP2017/001235 (including English translation), 4 pages.
(Continued)

*Primary Examiner* — Faye Francis
(74) *Attorney, Agent, or Firm* — MH2 Technology Law Group, LLP

(57) ABSTRACT

A powder pulverization device is provided. The device includes a hermetically sealed pulverization container, a powder introduction mechanism having an introduction inlet opened inwardly to the pulverization container, and introducing powder to be pulverized to the introduction inlet, a powder pulverization mechanism disposed at a portion below the introduction inlet in the pulverization container, and a classification device disposed at a portion above the introduction inlet in the pulverization container for screening pulverized powder and leading the screened powder out from the pulverization container. An inner wall of the pulverization container is covered with a porous lining material and each hole of the lining material communicates
(Continued)

with an air supply via a gap between the inner wall and the lining material.

4 Claims, 5 Drawing Sheets

(51) Int. Cl.
    *C01F 5/14*     (2006.01)
    *C01F 11/46*     (2006.01)

(58) Field of Classification Search
    USPC .......................................................... 241/39
    See application file for complete search history.

(56) References Cited

U.S. PATENT DOCUMENTS

| | | | | |
|---|---|---|---|---|
| 3,462,086 A * | 8/1969 | Bertrand | ............... | B02C 19/061 241/5 |
| 3,559,895 A * | 2/1971 | Fay | ...................... | B02C 19/061 241/5 |
| 3,726,484 A * | 4/1973 | Schurr | .................. | B02C 19/061 241/5 |
| 4,018,388 A * | 4/1977 | Andrews | ............... | B02C 19/061 241/39 |
| 4,056,233 A * | 11/1977 | Fay | ...................... | B02C 19/061 241/39 |
| 4,280,664 A * | 7/1981 | Jackson | ................ | B02C 19/061 241/39 |
| 4,579,288 A * | 4/1986 | McDermid | ........... | B02C 19/061 241/39 |
| 4,875,629 A * | 10/1989 | Brors | ...................... | B02C 19/06 241/39 |
| 5,980,815 A * | 11/1999 | Matsunaga | .............. | B02C 19/06 264/681 |
| 6,145,765 A * | 11/2000 | Capelle, Jr. | ........... | B02C 19/061 241/5 |
| 6,196,482 B1 * | 3/2001 | Goto | ....................... | B02C 19/06 241/39 |
| 7,258,290 B2 * | 8/2007 | Taketomi | .............. | B02C 19/063 241/40 |
| 2003/0025014 A1 * | 2/2003 | Sun | ......................... | B02C 19/06 241/39 |
| 2008/0054106 A1 * | 3/2008 | Zehavi | .................. | B02C 19/061 241/5 |
| 2010/0025506 A1 * | 2/2010 | Capelle, Jr. | ........... | B02C 19/061 241/5 |

FOREIGN PATENT DOCUMENTS

| | | |
|---|---|---|
| JP | H09-155222 A | 6/1997 |
| JP | H10-28857 A | 2/1998 |
| JP | 2000-033282 A | 7/1998 |
| JP | 2004-121958 A | 4/2004 |
| JP | 2004-313928 A | 11/2004 |
| JP | 2011-255268 A | 12/2011 |
| RU | 2100082 C1 | 12/1997 |
| RU | 2153937 C1 | 8/2000 |

OTHER PUBLICATIONS

Office Action dated Mar. 3, 2020 for corresponding Japanese Patent Application No. 2016-009803, 9 pages with English translation.
Office Action dated Feb. 21, 2020 for corresponding Russian Patent Application No. 2018130066, 15 pages with English translation.

* cited by examiner

POWDER GRINDING METHOD AND POWDER GRINDING MACHINE

CROSS-REFERENCE TO RELATED APPLICATIONS

This application is a U.S. National Stage application of PCT/JP2017/001235 filed 16 Jan. 2017, which claims priority to Japanese Application No. 2016-009803 filed 21 Jan. 2016, the entire disclosures of which are hereby incorporated by reference in their entireties.

TECHNICAL FIELD

The present invention relates to a method and a device for pulverizing powder, and more specifically to a powder pulverization method and a powder pulverization device that perform pulverization while avoiding powder adhesion to the inner surface of the pulverization container.

BACKGROUND ART

Previously, various powder pulverization devices have been provided. For example, Patent Document 1 discloses a powder pulverization device in which the powder to be pulverized is introduced toward the bottom of the pulverization container. The device has a pair of pulverization nozzles oppositely disposed in the bottom of the pulverization tank, and performs pulverization by accelerating powder by high-pressure airflow ejected from each of the pulverization nozzles, thereby causing the particles of the powder to collide with each other inside the pulverization container. Since the pulverization makes the powder finer and light-weight, the pulverized powder is carried by an upward flow generated inside the pulverization container and moves to a classification device disposed in an upper portion of the pulverization container. The powder is then classified by the classification device and collected to a recovery container.

CITATION LIST

Patent Documents

Patent Document 1: JP2000-033282A

SUMMARY OF INVENTION

Technical Problem

However, depending on the characteristics of the target powder, such as the shape or the physical property, the powder to be pulverized may not smoothly flow in the pulverization container. This has posed a problem that the powder introduced into the pulverization container often adheres to the inner wall of the pulverization container and is deterred from being carried by high-pressure airflow ejected from the pulverization nozzle, thus causing failure of pulverization. Further, even if the pulverization succeeded, there is another problem that, after the pulverization, the pulverized powder often adhered to the inner wall of the pulverization container and was deterred from being carried by an upward flow generated in the pulverization container, thus causing failure of transfer of the pulverized powder to a classification device.

The present invention was made in view of such a problem, and an object of the invention is to provide a powder pulverization method and a powder pulverization device capable of preventing powder adhesion to the inner surface of the pulverization container.

Solution to Problem

A powder pulverization method of the present invention is a method for pulverizing powder by causing high-pressure air to collide with powder introduced into a hermetically sealed pulverization container, and leading pulverized powder out from the pulverization container, the method comprising performing the pulverization of the powder while injecting air from a lined inner surface of the pulverization container.

Since this method performs pulverization of powder in a state in which air is injected from a lined inner surface of the pulverization container, it is possible to prevent the powder before the pulverization or the pulverized powder flowing near the inner surface of the pulverization container from adhering to the inner surface of the pulverization container.

A powder pulverization device of the present invention comprises a hermetically sealed pulverization container; a powder introduction mechanism having an introduction inlet opening inwardly to the pulverization container, and introducing powder to be pulverized to the introduction inlet; a powder pulverization mechanism disposed at a portion below the introduction inlet in the pulverization container for causing high-pressure air to collide with powder, thereby pulverizing the powder; and a classification device disposed at a portion above the introduction inlet in the pulverization container for screening pulverized powder and leading the screened powder out from the pulverization container, wherein an inner wall of the pulverization container is covered with a porous lining material and each hole of the lining material communicates with an air supply device via a gap between the inner wall and the lining material. The object described above is achieved by this powder pulverization device.

In this structure, the inner wall of the pulverization container is covered with a porous lining material having a large number of penetrating through-holes, and each hole of the lining material communicates with an air supply device via the gap between the inner wall of the pulverization container and the lining material. Thus, when air is supplied from the air supply device to the gap between the inner wall and the lining material, the air is injected into the pulverization container through each hole of the lining material. The injected air prevents the powder before the pulverization or the pulverized powder flowing near the lining material from adhering to the inner surface of the pulverization container.

Further, in previously known techniques, the powder that adheres to the inner wall is not led out from the pulverization container; therefore, the amount of the powder led out from the pulverization container (collection amount) with respect to the amount of the powder introduced into the pulverization container (supply amount), i.e., the powder collection ratio (yield), is small. However, in the present invention, since the powder does not adhere to the inner surface of the pulverization container, the powder collection ratio (yield) increases.

In a preferred embodiment, the pulverization container comprises a body and a bottom continuous from the body, and the lining material at least covers the whole region of the bottom and a region of the body lower than the classification device.

In the pulverization container, an upward flow is generated by high-pressure air injected from a powder pulverization mechanism, and the pulverized powder is carried to the classification device by this upward flow and is led to the outside of the pulverization container. Therefore, typically, the pulverized powder more easily adheres to a portion of the inner surface of the pulverization container lower than the classification device. Since the present invention has a structure in which the region lower than the classification device in the body of the pulverization container is covered with a lining material, it is possible to prevent powder adhesion to the body of the pulverization container.

Further, in the pulverization container, a downward flow is also generated by the high-pressure air injected from the powder pulverization mechanism. Thus, the powder is carried by this downward flow and collides with the bottom of the pulverization container, thereby often adhering to the inner surface of the bottom. Since the present invention has a structure in which the bottom of the pulverization container is covered with a lining material, it is possible to prevent the powder from adhering to the bottom of the pulverization container.

In particular, when the powder pulverization mechanism includes at least a pair of pulverization nozzles for injecting high-pressure air from injection outlets, wherein the pulverization nozzles are disposed so that the injection outlets are oppositely disposed, the powder introduced into the pulverization container more easily adheres to the inner surface of the pulverization container; however, in the present invention, since the inner wall of the pulverization container is covered with a lining material, it is possible to prevent the powder from adhering to the inner surface of the pulverization container.

Advantageous Effects of Invention

As described above, in the present invention, pulverization of powder is performed in a state in which air is ejected from the inner surface of the pulverization container; therefore, it is possible to prevent the powder before the pulverization or the pulverized powder from adhering to the inner surface of the pulverization container.

DESCRIPTION OF EMBODIMENTS

Below, an embodiment of the present invention is described by referring to drawings.

Figure 1:
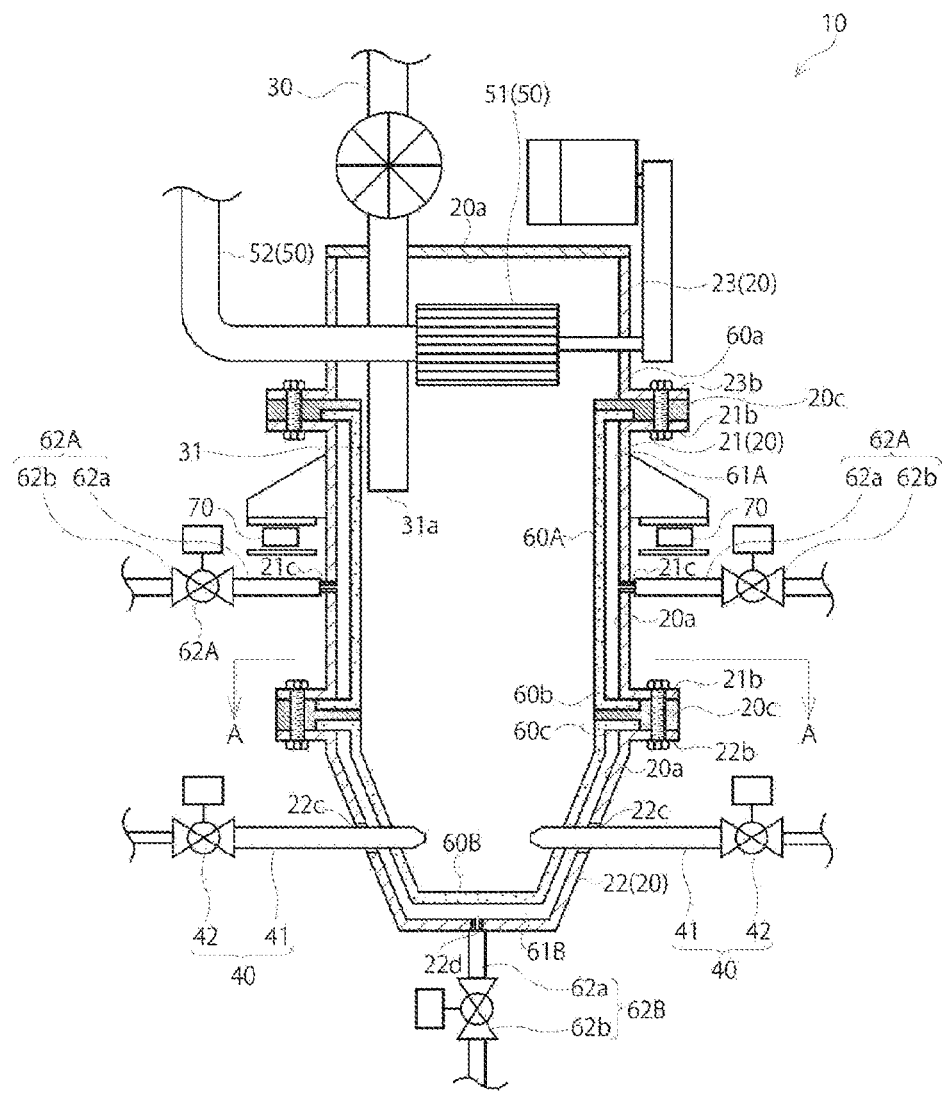
FIG. 1 is a schematic cross-sectional view of a powder pulverization device according to one embodiment of the present invention.
Figure 3:
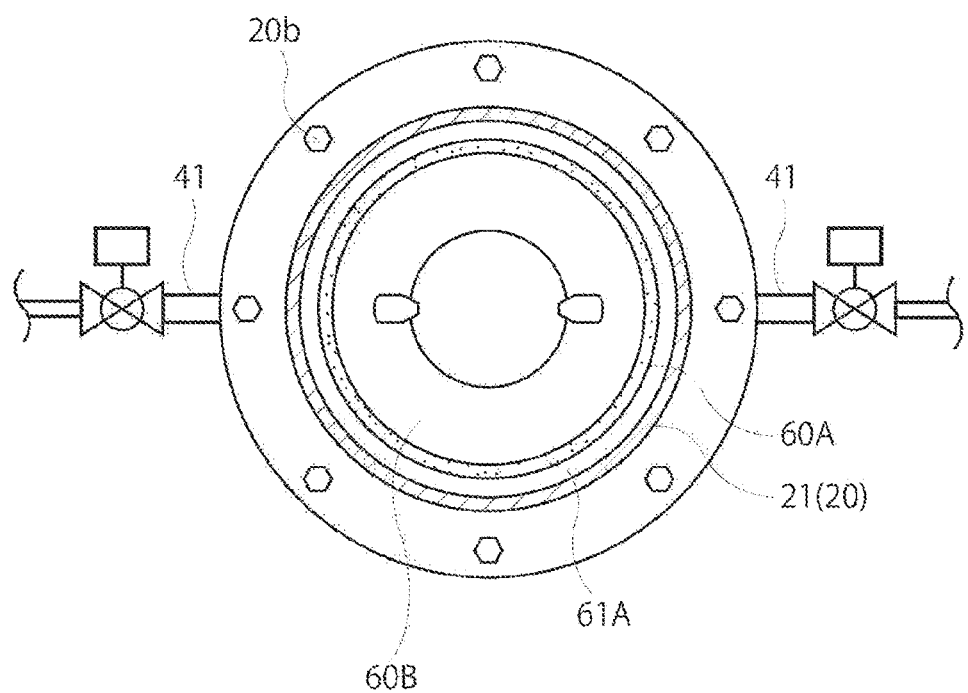
FIG. 3 is a cross-sectional view, taken along the line A-A in FIG. 1.

FIG. 1 is a vertical cross-sectional view of a powder pulverization device 10 in which a powder pulverization method of the present invention is implemented, and FIG. 3 is a horizontal cross-sectional view of the powder pulverization device 10. The powder pulverization device 10 includes a hermetically sealed pulverization container 20, a powder introduction mechanism 30, a powder pulverization mechanism 40, a classification device 50, and lining materials 60A and 60B.

Figure 2:
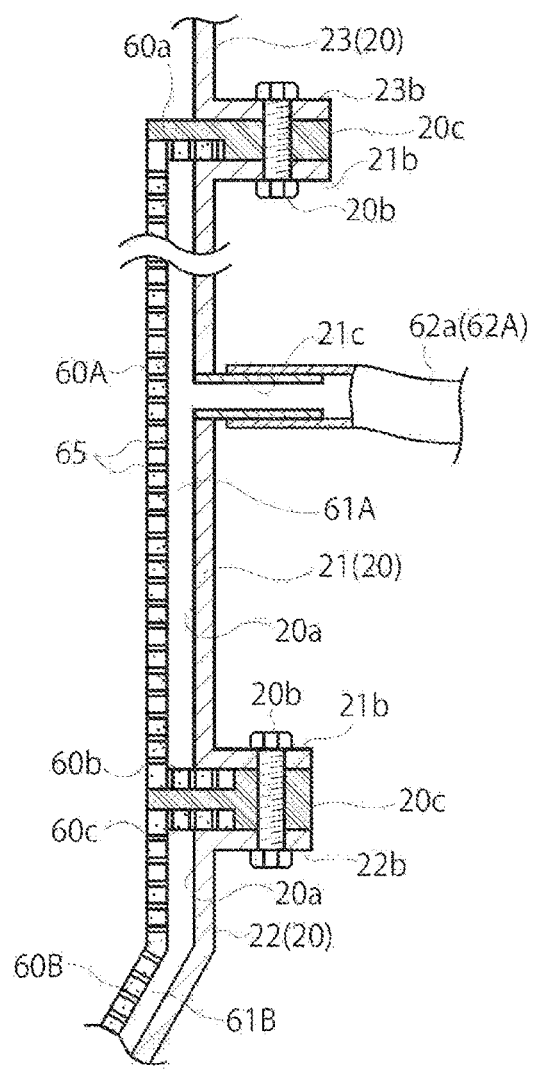
FIG. 2 is a cross-sectional view showing a main part of a pulverization container.

In the pulverization container 20, at least an inner wall 20a is formed of stainless steel (SUS), and the pulverization container 20 includes a cylindrically shaped body 21, a bottom 22 having a upward-widening shape provided continuously from the lower end of the body 21, and a cap-shaped cap 23 provided continuously from the upper end of the body 21. As shown in FIG. 2, flanges 21b, 22b, and 23b are provided on the upper and lower ends of the body 21, the upper end of the bottom 22, and the lower end of the cap 23, respectively. The flange 60a in an upper end of the lining material 60A is placed between the flange 21b in an upper end of the body 21 and the flange 23b in a lower end of the cap 23, and the flanges are fastened with a plurality of bolts 20b, thereby connecting the body 21 and the cap 23; further, the flange 60b in a lower end of the lining material 60A and the flange 60c in an upper end of the lining material 60B are placed between the flange 21b in a lower end of the body 21 and the flange 22b in an upper end of the bottom 22, and the flanges are fastened with a plurality of bolts 20b, thereby connecting the body 21 and the bottom 22. The pulverization container 20 is thus assembled.

The pressure in the pulverization container 20 is kept at −0.5 to −5.0 kPa by an air exhaust device provided in the classification device 50.

The pulverization container 20 is not limited to the structure in which the body 21, the bottom 22, and the cap 23 are separately provided. For example, the body 21 and the bottom 22 may be integrally provided.

The powder introduction mechanism 30 includes a powder introduction tube 31 penetrating through the upper wall of the cap 23 and protruding downward to the pulverization container 20, and the powder introduction mechanism 30 introduces the powder to be pulverized into the pulverization container 20 via an introduction inlet 31a opened in an lower end of the powder introduction tube 31.

The powder pulverization mechanism 40 includes a plurality of (2 in this embodiment) pulverization nozzles 41 that protrude into the pulverization container 20. In this structure, the injection outlets of the pair of pulverization nozzles 41 are preferably oppositely disposed to maximize the pulverization efficiency. Therefore, the pulverization nozzles 41 are inserted in and supported by through-holes 22c provided on the wall of the bottom 22 of the pulverization container 20 so that their injection outlets are oppositely disposed in a portion below the introduction inlet 31a. The through-holes are sealed with packing or the like (not shown). High-pressure air is supplied from a pressure air source (not shown) via a solenoid valve 42. The particles of the powder carried by the high-pressure airflow injected from the injection outlets of the pulverization nozzles 41 collide with each other, thereby being pulverized into finer particles. The pulverization nozzles 41 may be provided in the body 21. Although the pressure of the high-pressure air is 0.8 to 1.0 MPa, 10 Nm3 in this embodiment, the pressure is not limited to this range.

The classification device 50 includes a classification rotor 51 and an air exhaust device (not shown). The classification rotor 51 is supported by the cap 23 of the pulverization container 20 and is disposed in a upper portion relative to the introduction inlet 31a of the powder introduction mechanism 30. The classification device 50 screens powder having a predetermined diameter or less from the pulverized powder by the rotation force of the classification rotor 51, and leads the screened powder to the outside of the pulverization container 20 via the duct 52. The classification device 50 may be provided in the body 21.

The distance from the position of the pulverization nozzles 41 to the lower end of the classification device 50 is 0.5 m to 2 m.

The inner wall 20a of the pulverization container 20 is covered with porous lining materials 60A and 60B having a large number of through-holes. The inner wall 20a of the pulverization container 20 and the lining materials 60A and 60B together form the inner surface of the pulverization container 20. The lining material 60B, i.e., one of these lining materials, covers the whole region of the bottom 22 of the pulverization container 20, and the lining material 60A, i.e., the other lining material, covers the region lower than the classification device 50 of the body 21. In the present embodiment, the classification rotor 51 is provided at substantially the same height as that of the upper end of the body 21; therefore, the whole region of the body 21 is covered with the lining material 60A. When the classification rotor 51 is positioned lower than the upper end of the body 21, the lining material 60A may cover only the region lower than the classification device 50 of the body 21.

Further, the inner wall 20a of the cap 23 may be covered with a lining material.

The lining materials 60A and 60B are provided so that the gaps 61A and 61B are formed between the lining materials 60A and 60B and the inner wall 20a. The small holes 65 of the lining material 60 communicate with the air supply devices 62A and 62B via the gaps 61A and 61B between the inner wall 20a and the lining materials 60A and 60B, thereby causing the air supplied from the air supply devices 62A and 62B to eject into the pulverization container 20 via the holes 65.

More specifically, in this embodiment, the first gap 61A intervenes between the inner wall 20a of the body 21 of the pulverization container 20 and the lining material 60A, and the second gap 61B intervenes between the inner wall 20a of the bottom 22 of the pulverization container 20 and the lining material 60B. The ends of the gaps 61A and 61B are sealed with packing 20c. As shown in FIG. 2, in the junction of the body 21 and the bottom 22, the flange 60b of the lining material 60A of the body 21 is placed between the packing 20c and the flange 21b of the body 21, and the flange 60c of the lining material 60B of the bottom 22 is placed between the packing 20c and the flange 22b of the bottom 22, and are integrally fixed with a plurality of bolts 20b. Also in the junction of the body 21 and the cap 23, as in the junction of the body 21 and the bottom 22, the flange 60a of the lining material 60A of the body 21 is placed between the packing 20c and the flange 21b of the body 21, and is integrally fixed with a plurality of bolts 20b together with the flange 23b of the cap 23.

As shown in FIGS. 1 and 2, the body 21 has two inlets 21c, each of which is connected to an air supply hose 62a of the air supply devices 62A. The air supply devices 62A supply air to the first gap 61A between the body 21 and the lining material 60A from a pressure air source (not shown).

Similarly, the bottom 22 also has an inlet 22d to be connected to an air supply hose 62a of the air supply device 62B. The air supply device 62B supplies air to the second gap 61B between the bottom 22 and the lining material 60B from a pressure air source (not shown). In FIG. 1, the reference number 62b is a solenoid valve and serves to control supply of air or the like.

The pressure of the air supplied by the air supply devices 62A and 62B is 0.5 MPa or less, and preferably not less than 0.1 MPa and not more than 0.2 MPa. The pressure is set according to the pressure resistance of the lining materials 60A and 60B.

In this embodiment, a high-density polyethylene microporous barrier membrane (film) (Fuji Chemical Industries, Ltd.) having a porosity of 47.3% is used as the lining materials 60A and 60B; however, the lining materials 60A and 60B are not limited to this product and any article having a large number of through-holes, in other words, any porous material, may be used. Examples include molded articles obtained by rendering a material into a porous material by ion-beam irradiation or etching. Examples of the material include zirconia, alumina, silica, titania, silicon carbide, boron carbide, silicon nitride, boron nitride, cordierite, hydroxyapatite, sialon, zircon, aluminum titanate, barium titanate, strontium titanate, mullite, and like ceramics; low-density polyethylene, medium-density polyethylene, high-density polyethylene ultrahigh-density polyethylene, linear low-density polyethylene, and like polyethylenes, polypropylene, polystyrene, polyvinyl chloride, polyvinyl fluoride, polyvinylidene chloride, acrylonitrile-butadiene-styrene copolymer (ABS resin), and like styrene polymers or copolymers; 6-nylon, 66-nylon, 12-nylon, and like polyamides; polyamide imide, polyimide, polyether imide, polyurethane, polymethylmethacrylate, and like acrylic resins; polyvinyl acetate, ethylene-vinyl acetate copolymer, polyvinylidene fluoride, polytetrafluoroethylene, and like fluororesins; alkenyl aromatic resin, polyethylene terephthalate, polybutylene terephthalate, polyethylene naphthalate, polylactic acid, and like polyesters; bisphenol-A-based polycarbonate, and like polycarbonate; polyacetal, polyphenylene sulfide, polymethylpentene, cellulose, polyvinyl alcohol, polyvinyl acetal, polyacrylonitrile, and like polyacrylic acids; styrene-acrylonitrile copolymer (AS resin), polyphenylene ether (PPE), modified PPE, polyarylate, polyphenylene sulfide, polysulfone, polyether sulfone, polyether nitrile, polyether ketone, polyketone; copolymers of liquid crystal polymer ethylene and propylene; copolymers of ethylene or propylene and other α-olefin (butene-1, pentene-1, hexene-1, 4 methylpentene-1, etc.); copolymers of ethylene and other ethyleny unsaturated monomers (vinyl acetate, acrylic acid, acrylic acid ester, methacrylic acid, methacrylic acid ester, vinyl alcohol, etc.), and the like. Examples also include molded articles obtained by bonding the particles of the resins listed above.

Further, the lining materials 60A and 60B may be structured from, for example, a natural fiber such as raw silk, a polymer material such as polyethylene or polyester, or a film-like material in which a metal material such as stainless-steel is woven into a meshed state. Examples of the material obtained by weaving a metal material into a meshed state include Poremet, Bonmesh, Pore-flo, and the like.

The lining materials 60A and 60B preferably have a porosity of not less than 10% and not more than 90%. The porosity of the lining materials 60A and 60B is measured as follows.

Method for Measuring Porosity

The lining material 60A/60B is cut into a 10-cm-square film-shaped molded article, and the weight (unit: g) of the molded article is measured to the first decimal place. Further, the thickness of the molded article is measured at at least four points on the flat plane of the molded article, and the measured values are averaged. Then the following equations are applied.

Volume of molded article (cm$^3$)=Average Thickness (cm)×10 (cm)×10 (cm)

Apparent Density of Molded Article (g/cm³)=Weight of Molded Article/Volume of Molded Article The porosity (void content) is calculated according to the following formula.

Porosity (Void Content)(%)=Density of Molded Article/Density of Material of Molded Article× 100

Although FIG. 2 shows a magnified view of each hole of the lining materials 60A and 60B for ease of explanation, the size in the figure is not based on the actual diminishing scale.

Further, a load cell 70 is provided in the body 21 of the pulverization container 20 for measuring the weight of the powder pulverization device 10, including the weight of the powder in the pulverization container 20. The measurement by the load cell 70 enables calculation of the amount of the powder introduced into the pulverization container 20, thereby allowing control of, for example, increase and decrease in the introduction amount.

Further, the powder pulverization device 10 may include a fixed-amount supply device, such as a screw feeder, for introducing powder to be pulverized to the pulverization container 20 in a constant amount per unit of time. With the fixed-amount supply device, the pulverization amount of the powder pulverization device 10 per unit time can be equalized.

The operation of the powder pulverization device 10 of the present invention is described below.

When the powder to be pulverized is introduced into the pulverization container 20 from the introduction inlet 31a of the powder introduction mechanism 30, the powder is accelerated by high-pressure air ejected from the pulverization nozzles 41 of the powder pulverization mechanism 40, thereby causing the particles of the powder to collide with each other inside the pulverization container 20, and the powder is thereby pulverized. The pulverization makes the powder finer, and the pulverized powder is carried by the upward flow generated inside the pulverization container 20 to the classification rotor 51 disposed in an upper portion of the pulverization container 20. The powder is screened depending on the diameter and is led out from the pulverization container 20 via the duct 52.

At this time, when air is supplied to the first gap 61A and the second gap 61B from the air supply devices 62A and 62B, the air is ejected from each hole 65 of the lining materials 60A and 60B into the pulverization container 20. The ejected air prevents the powder before the pulverization or the pulverized powder flowing near the lining materials 60A and 60B from adhering to the lining materials 60A and 60B. Therefore, the powder does not adhere to the lining materials 60A and 60B, and is screened by the classification rotor 51; the screened powder is then led out from the pulverization container 20.

The powder to be pulverized is not particularly limited, and may be any inorganic substances and organic substances. Examples of the inorganic substances include oxides, chlorides, sulfates, carbonates, nitrates, hydroxides, nitrides, and carbides of elements belonging to Groups 1 to 13 of the periodic table, or complex compounds and mixtures of these substances, which are either present in nature or industrially produced. Examples of organic substances include aliphatic compounds, aromatic compounds, polymer compounds and mixtures thereof, which are in a solid form at room temperature.

Further, since the surface energy of the powder increases with pulverization, the powder pulverization device 10 of the present invention particularly exerts its effects with respect to powder having a property of causing severe aggregation or having inferior fluidity.

Further, the powder pulverization device 10 of the present invention is also effective for the pulverization of powder having a melting point of 60° C. or less, which will become fused upon pulverization using a previously known pulverizer.

Before the powder to be pulverized is introduced into the pulverization container 20, the powder may be sieved with a sieve having a mesh size of about 5 mm so as to remove coarse particles. Further, the powder may be pulverized in advance using a pulverizer such as an ice crusher, a feather mill, or a hammer mill, and may also be sieved after the pulverization to remove coarse particles. Since the fluidity of the powder to be pulverized increases by removing coarse particles, the powder may be more easily introduced, thereby enabling stable supply in a fixed amount.

Figure 4:
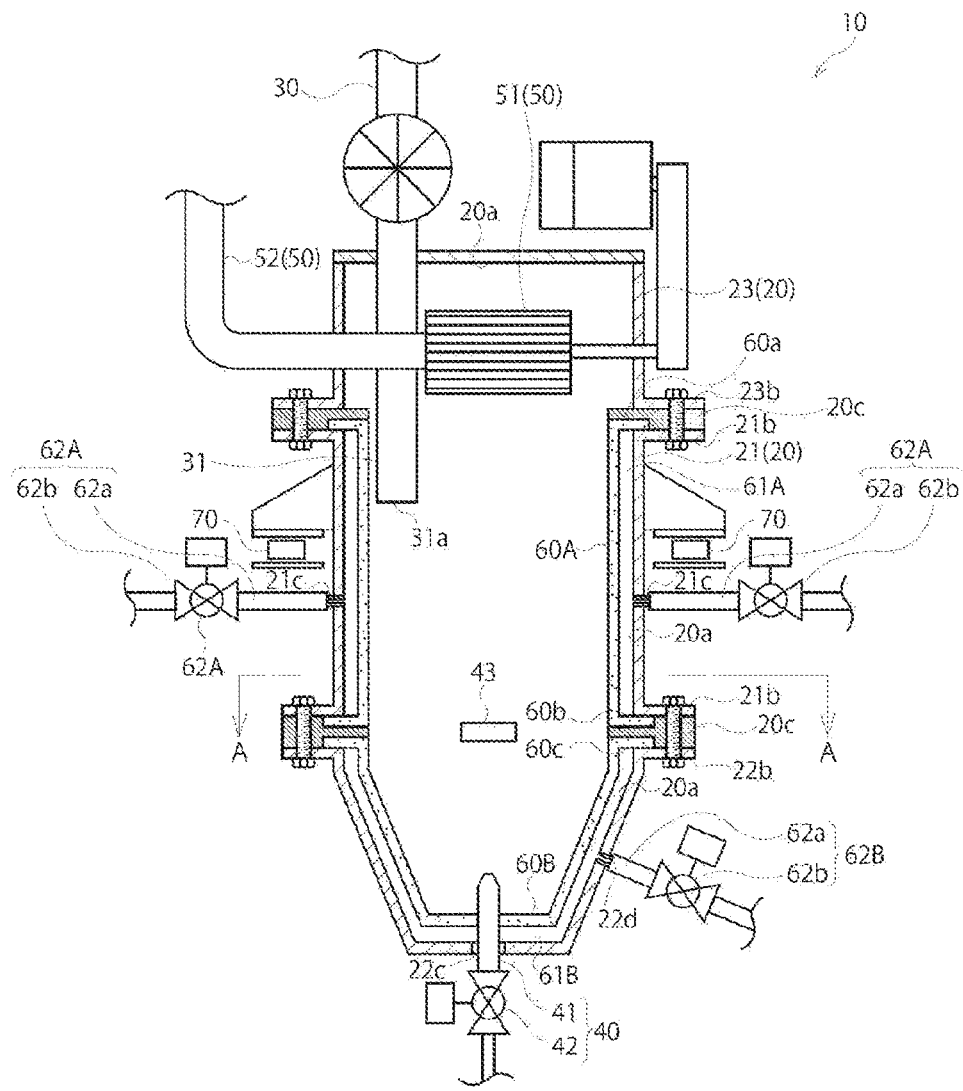
FIG. 4 is a schematic cross-sectional view showing another example of a powder pulverization mechanism.

FIG. 4 shows another example of the present invention. The powder pulverization mechanism 40 shown in FIG. 4 includes a pulverization nozzle 41 that protrudes into the pulverization container 20. The pulverization nozzle 41 is inserted via the through-hole 22c provided on the bottom surface of the bottom 22 of the pulverization container 20, and projects upward in the pulverization container 20. Further, a collision plate 43 is disposed at a portion opposite to the pulverization nozzle 41 in the pulverization container 20 at the same height as that of the flange 22b of the bottom 22. The collision plate 43 is supported by a support member (not shown) having a position adjustment mechanism and the like.

When the powder to be pulverized is introduced into the pulverization container 20, the powder is accelerated by a suction force of high-pressure air ejected from the pulverization nozzle 41, and collides with the collision surface of the collision plate 43; the powder is thereby pulverized.

Also in this embodiment, the air ejected from the holes of the lining materials 60A and 60B prevents the powder before the pulverization or the pulverized powder flowing near the lining materials 60A and 60B from adhering to the lining materials 60A and 60B.

The other structures and working effects are the same as those in the embodiment shown in FIG. 1; therefore, they are given the same reference numerals and the explanations are omitted.

An example is shown below. However, the present invention is not limited to the following example.

The particle size distributions of the powder before pulverization and the pulverized powder were measured as follows.

First, 60 mL of 0.025 wt % sodium hexametaphosphate aqueous solution was added to 0.1 g of a sample (a powder sample before or after pulverization), and the mixture was subjected to a dispersion treatment for 2 minutes using an ultrasonic homogenizer (US-600: Nissei Corporation) at a strength of V-LEVEL 3, thereby preparing a suspension of the sample. The measurement was performed using a laser diffraction/scattering particle size analyzer (LA-950-V2: HORIBA). 0.025 wt % sodium hexametaphosphate aqueous solution was circulated in a sample circulator, and the suspension prepared above was added dropwise so that the transmittance was 80 to 95%, followed by ultrasonic dispersion for 60 seconds at a circulation rate of 5 and a stirring speed of 1. The obtained dispersion was subjected to the measurement.

Preparation of Magnesium Hydroxide

The same treatment as that disclosed in Example 1 of JP2012-72004A was performed, thereby obtaining a slurry containing magnesium hydroxide particles. This slurry containing magnesium hydroxide particles was filtered and dried, thereby obtaining a dry cake of magnesium oxide. The dry cake was pulverized using a hammer mill with a screen having a mesh size of 3 mm, thereby obtaining surface-untreated magnesium hydroxide powder having an average particle size of 30 μm.

Example 1

The surface-untreated magnesium hydroxide powder having an average particle size of 30 μm was pulverized using a 40-L-volume powder pulverization device 10 shown in FIG. 1. The powder pulverization device 10 was operated with the following conditions: operation time: 1 hour; high-pressure air for pulverization ejected from the pulverization nozzle 41: 0.8 MPa, 10 Nm3; nozzle diameter of the pulverization nozzle 41: 8 mm; pressure in the pulverization container 20: −1 kPa; diameter of the classification rotor 51 of the classification device 50: 140 mm; rotation speed of the classification rotor 51: 6000 rpm; pressure of the air supplied from the air supply devices 62A, 62A, 62B: 0.1 MPa; the amount (supply amount) of powder introduced into the pulverization container 20: 50 kg/hour.

As a result, powder having an average particle size of μm was obtained, and the powder was completely free from particles of 3 μm or greater. The ratio (yield) of collected powder was calculated from the amount of powder to be introduced into the pulverization container 20 (supply amount) and the amount of the powder led out from the pulverization container 20 (collection amount); the yield was 99%. The inside of the pulverization container 20 was visually confirmed after the pulverization operation, and it was confirmed that almost no adhesion of powder was observed in the lining materials 60A and 60B of the pulverization container 20. Further, the weight of the powder pulverization device 10 before the pulverization operation and the weight after the pulverization operation were compared; as a result, no increase in weight was confirmed. Therefore, it was confirmed that there was also no adhesion to a portion that cannot be visually confirmed in the pulverization container 20.

Comparative Example 1

Figure 5:
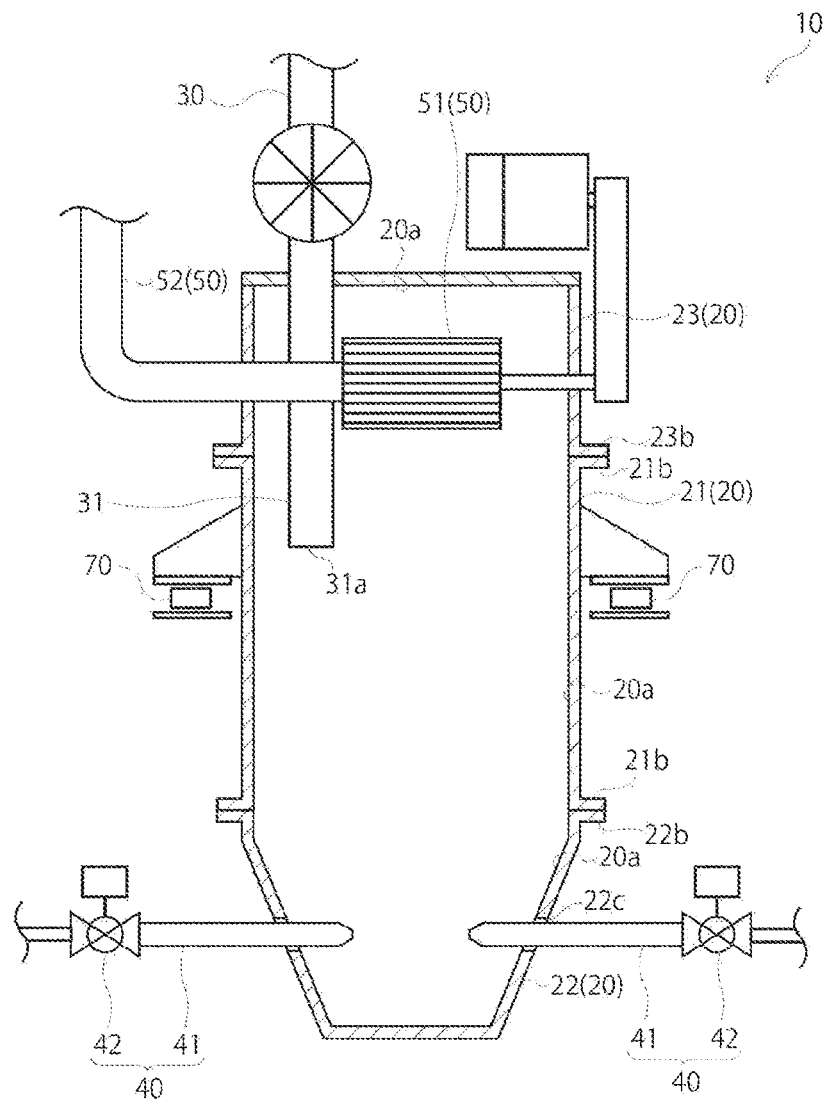
FIG. 5 shows a previously known powder pulverization device.

A powder pulverization device 10 without a lining material shown in FIG. 5 was used. The powder pulverization device 10 shown in FIG. 5 is identical to the powder pulverization device 10 shown in FIG. 1, except that it does not have the lining materials 60A and 60B. Therefore, identical components are given the same reference numerals and their explanations are omitted. The same magnesium hydroxide powder as that used in Example 1 was introduced into the pulverization container 20 and was pulverized under the same conditions as in Example 1. However, during the operation of the powder pulverization device 10, the delivery of the pulverized powder to the outside of the pulverization container 20 stopped. Therefore, the operation of the powder pulverization device 10 was halted and the inside of the pulverization container 20 was visually examined. It was confirmed that magnesium hydroxide was deposited on the inner wall 20a of the pulverization container 20.

Comparative Example 2

The same magnesium hydroxide as that used in Example 1 was pulverized using a powder pulverization device 10 without lining materials shown in FIG. 5. The amount of the powder supplied to the device to be pulverized was 10 kg/hour. The other conditions were the same as those in Example 1.

As a result, 5 kg of powder having an average particle size of 5 μm containing particles of 30 μm or greater at a proportion of 50% was obtained. The yield calculated from the supply amount and the collection amount was 50%. The inside of the pulverization container 20 was visually confirmed after the pulverization operation, and it was confirmed that a large amount of powder adhered to the inner wall 20a. Further, the weight of the powder pulverization device 10 after the completion of the pulverization operation was measured; the weight increased by about 5 kg compared with the weight before the pulverization operation.

In Comparative Example 2, the amount per hour of the powder supplied to the device to be pulverized was reduced, compared with Comparative Example 1. However, the weight of the powder pulverization device 10 after the completion of the pulverization operation increased presumably because the powder was not fully fluidized in the pulverization container 20, and powder of 30 μm or larger adhered to the inner wall 20a of the pulverization container 20 and stayed on the inner wall 20a without being removed.

Example 2

Barium sulfate powder (BARIACE BMH: Sakai Chemical Industry Co., Ltd.) having an average particle size of 3 μm was pulverized using the powder pulverization device 10 shown in FIG. 1. The powder pulverization device 10 was operated with the following conditions: operation time: 1 hour; high-pressure air for pulverization ejected from the pulverization nozzle 41: 1.0 MPa, 10 Nm3; nozzle diameter of the pulverization nozzle 41: 6 mm; pressure in the pulverization container 20: −1 kPa; diameter of the classification rotor 51 of the classification device 50: 140 mm; rotation speed of the classification rotor 51: 6000 rpm; pressure of the air supplied from the air supply devices 62A and 62B: 0.1 MPa; amount (supply amount) of powder introduced into the pulverization container 20: 40 kg/hour.

As a result, powder having an average particle size of 0.8 μm was obtained, and the powder was completely free from particles of 2 μm or greater. The yield calculated from the supply amount and the collection amount was 99%. The inside of the pulverization container 20 was visually confirmed after the pulverization operation, and it was confirmed that almost no adhesion of powder was observed in the lining materials 60A and 60B. Further, the weight of the powder pulverization device 10 before the pulverization operation and the weight after the pulverization operation were compared; as a result, no increase in weight was confirmed. Therefore, it was confirmed that there was also no adhesion to a portion that cannot be visually confirmed in the pulverization container 20.

Comparative Example 3

A powder pulverization device 10 without a lining material shown in FIG. 5 was used. The same barium sulfate powder as that used in Example 2 was introduced into the pulverization container 20 and was pulverized under the same conditions as in Example 2. However, during the operation of the powder pulverization device 10, the delivery of the pulverized powder to the outside of the pulverization container 20 stopped. Therefore, the operation of the powder pulverization device 10 was halted and the inside of the pulverization container 20 was visually examined. It was confirmed that barium sulfate was deposited on the inner wall 20a of the pulverization container 20.

Comparative Example 4

The same barium sulfate as that used in Example 2 was pulverized using the powder pulverization device 10 without a lining material shown in FIG. 5. The amount of the powder supplied to the device to be pulverized was 5 kg/hour. The other conditions were the same as those in Example 2.

As a result, powder having an average particle size of 2.8 μm containing particles of 3 μm or greater at a proportion of 80% was obtained. The yield calculated from the supply amount and the collection amount was 70%. The inside of the pulverization container 20 was visually confirmed after the pulverization operation, and it was confirmed that a large amount of powder adhered to the inner wall 20a. Further, the weight of the powder pulverization device 10 after the completion of the pulverization operation was measured; the weight increased by about 1.4 kg compared with the weight before the pulverization operation.

In Comparative Example 4, the amount per hour of the powder supplied to the device to be pulverized was reduced, compared with Comparative Example 3. However, the weight of the powder pulverization device 10 after the completion of the pulverization operation increased presumably because the powder was not fully fluidized in the pulverization container 20, and 3 μm or larger powder adhered to the inner wall 20a of the pulverization container 20 and stayed on the inner wall 20a without being removed.

In the present invention, the inner wall 20a of the pulverization container 20 is covered with the porous lining materials 60A and 60B, and each hole of the lining materials 60A and 60B communicates with the air supply devices 62A and 62B via the gaps 61A and 61B between the inner wall 20a and the lining materials 60A and 60B. Thus, when air is supplied from the air supply device 62 to the gaps 61A and 61B between the inner wall 20a and the lining materials 60A and 60B, the air is ejected into the pulverization container 20 through each hole of the lining materials 60A and 60B. The ejected air prevents the powder before the pulverization or the pulverized powder flowing near the lining materials 60A and 60B from adhering to the lining materials 60A and 60B of the pulverization container 20.

Further, since the powder is prevented from adhering to the lining materials 60A and 60B of the pulverization container 20, the powder introduced into the pulverization container 20 is pulverized to a predetermined particle size and is led to the outside of the pulverization container 20 from the classification device 50. Therefore, the amount of the powder led out from the pulverization container 20 (collection amount) with respect to the amount of the powder to be introduced into the pulverization container 20 (supply amount); that is, the yield of the powder, is nearly 100%.

Although some embodiments of the present invention have been described above, the present invention is not limited to those embodiments, and various modifications may be made without departing from the gist of the present invention.

REFERENCE NUMERALS

10: Powder pulverization device
20: Pulverization container
20a: Inner wall
21: Body
22: Bottom
30: Powder introduction mechanism
31: Powder introduction tube
31a: Introduction inlet
40: Powder pulverization mechanism
50: Classification device
60A, 60B: Lining material
61A, 61B: Gap between inner wall of pulverization container and lining material
62A, 62B: Air supply device
65: Hole

The invention claimed is:

1. A powder pulverization device comprising:
a hermetically sealed pulverization container;
a powder introduction mechanism having an introduction inlet opening inwardly to the pulverization container, and introducing powder to be pulverized to the introduction inlet;
a powder pulverization mechanism disposed at a portion below the introduction inlet in the pulverization container for causing high-pressure air to collide with powder, thereby pulverizing the powder; and
a classification device disposed at a portion above the introduction inlet in the pulverization container for screening pulverized powder to a screened powder and leading the screened powder out from the pulverization container,
wherein an inner wall of the pulverization container is covered with a porous lining material and each hole of the porous lining material communicates with an air supply device via a gap between the inner wall and the porous lining material.

2. The powder pulverization device according to claim 1, wherein the pulverization container comprises a body and a bottom continuous from the body, and the porous lining material at least covers a whole area of the bottom and an area of the body lower than the classification device.

3. The powder pulverization device according to claim 1, wherein the powder pulverization mechanism comprises at least a pair of pulverization nozzles for injecting high-pressure air from injection outlets, and the at least a pair of pulverization nozzles are disposed so that the injection outlets are oppositely disposed.

4. The powder pulverization device according to claim 2, wherein the powder pulverization mechanism comprises at least a pair of pulverization nozzles for injecting high-pressure air from injection outlets, and the at least a pair of pulverization nozzles are disposed so that the injection outlets are oppositely disposed.

* * * * *